3,391,540
TURBOJET ENGINES HAVING CONTRA-
ROTATING COMPRESSORS
Louis Jules Bauger, Vanves, Jean Georges Bouiller,
Brunoy, Michel Robert Garnier, Sceaux, and Armand
Jean-Baptiste Lacroix, Itteville, France, assignors to
Societe Nationale d'Etude et de Construction de
Moteurs d'Aviation, Paris, France, a company of
France
Filed Aug. 3, 1966, Ser. No. 569,969
Claims priority, application France, Aug. 5, 1965,
27,358
2 Claims. (Cl. 60—226)

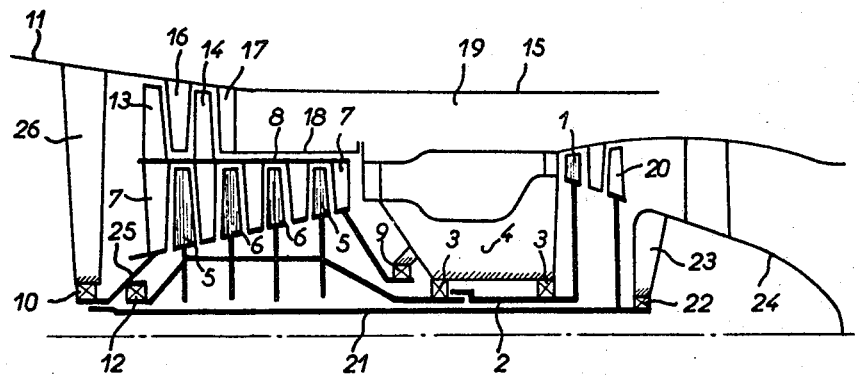

ABSTRACT OF THE DISCLOSURE

A turbofan engine having a contra-rotating compressor within its inner duct and ducted fan blades discharging into its outer duct, said inner duct further including two contra-rotating turbine blade rings surrounded by a stationary casing and inwardly fast with respective coaxial shafts which drive respective compressor rotors, one of said rotors being inwardly fast with one of said shafts while the other rotor is outwardly fast with a rotary sleeve with the compressor blades of said other rotor projecting inwardly from said sleeve and fan blades projecting outwardly therefrom, said sleeve being driven from the other of said shafts.

---

This invention relates to a turbofan engine having a contra-rotating compressor within its inner duct and ducted fan blades discharging into its outer duct.

In a turbofan engine of the kind in question, the compressor comprises an inner rotor and, in place of the traditional stator, an outer rotor coaxial with the inner rotors, these rotors revolving, in a known manner, in opposite directions and each having sets of blades which are imbricated with each other or interdigitated in such a manner that the air passes alternately through a set of blades of one of the rotors and then through a set of blades of the other rotor.

The present invention is concerned with an engine in which the drive of one of the rotors is effected by one of the turbine stages through the agency of a shaft connected to the inner periphery of the sets of blades forming part of this rotor, the drive of the other rotor being effected by another stage of the turbine and through the agency of another shaft, concentric with the first-mentioned shaft, and of a sleeve connected to the outer periphery of the sets of blades forming part of this other rotor.

According to a preferred feature of the present invention, the connection between the sleeve and the shaft driving it is effected at the upstream end of this sleeve, that is, on the side of the sleeve remote from the turbine.

In the accompanying drawing:
FIGURE 1 diagrammatically illustrates in axial half section a turbofan engine according to the invention.

In the embodiment according to FIGURE 1, a high-pressure stage 1 of the turbine drive, through the agency of a shaft 2 provided with splines and rotatably supported by means of bearings 3 inside a fixed casing 4, the sets of blades 5 of the inner rotor, these blades being connected to their drive shaft 2 at their inner periphery 6.

In the spaces formed between the sets of blades 5 and, where applicable, upstream of the first of these blade sets 5 of the inner rotor, are arranged the sets of blades 7 of an outer rotor. These sets of blades 7 are attached at their outside outer periphery to a sleeve 8, in this instance in the form of a straight cylinder having an axis parallel to the axis of the turbofan engine.

The outer rotor is rotatably supported, by means of the bearing 9, inside the fixed casing 4, and, by means of the bearing 10, inside the air intake casing 11. A bearing 12 ensures maintenance of the gap between the two rotors at the upstream end.

A sleeve 8 on its outside carries two moving sets of blading 13 and 14 followed, in the direction of motion of the secondary air flow, by two sets of vanes attached to an outside casing 15, the first of these fixed sets of vanes, denoted by the reference number 16, being a corrective set of vanes and the second, denoted by the reference number 17, being a system of discharge guide vanes. The sets of vanes 16 and 17 also ensure the centering of the outside casing 15 on a shell 18 which forms, over a portion of its length, the inside boundary of an annular duct 19 for the secondary air flow.

The outer rotor drive is effected by a low-pressure stage 20 of the turbine, this stage being connected to the outer rotor by a shaft 21 which is concentric with the shaft 2. The shaft 21 is supported, at its downstream end, in a bearing 22 carried by a frame 23 which is rigid with an exhaust jet pipe 24 for the turbine. At its upstream end, the shaft 21 is angularly rigid with an element 25 (by means of splines, for example), by means of which the outer rotor is supported in the bearing 10.

It will be seen that, in accordance with the present invention, it is at the upstream end of the outer rotor that the element 25, connnecting this rotor to its drive shaft 21, is attached to the said outer rotor and, consequently, at its upstream end that this rotor receives its drive.

In the embodiment illustrated, it will be noted that the set of fixed vanes 26 mounted inside the intake casing 11 extend across both the primary flow and the secondary flow.

What we claim is:
1. A ducted-fan turbine engine comprising:
an inner duct and an outer duct extending therearound,
two contra-rotating turbine blade rings within said inner duct,
a stationary casing surrounding said turbine blade rings and separating in part said inner and outer ducts,
two contra-rotating turbine discs respectively carrying at the periphery thereof said turbine blade rings,
two contra-rotating coaxial shafts respectively fast with said turbine discs inwardly from said turbine blade rings,
two contra-rotating compressor rotors with interdigitated compressor blade rings within said inner duct, one of said rotors being inwardly fast with one of said shafts,
a rotary sleeve surrounding said compressor blade rings and separating in part said inner and outer ducts, the other of said rotors being outwardly fast with said sleeve with the compressor blades of said other rotor projecting inwardly from the inner surface of said sleeve, a drive connection between said sleeve and the other of said shafts, and fan blades within said outer duct, fast with said rotary sleeve and projecting outwardly from the outer surface of said sleeve.

2. Engine as claimed in claim 1, wherein said two turbine blade rings belong respectively to a high-pressure turbine stage and to a low-pressure turbine stage, and wherein said rotary sleeve together with said fan blades and said other rotor compressor blades are driven from said low-pressure turbine stage.

References Cited

UNITED STATES PATENTS 2,404,767 7/1946 Heppner _____ 60—39.16
2,451,944 10/1948 Hall _____ 230—123

MARTIN P. SCHWADRON, *Primary Examiner.*

CARLTON R. CROYLE, *Examiner.*

D. HART, *Assistant Examiner.*